(12) United States Patent
Rehmanji et al.

(10) Patent No.: US 9,758,753 B2
(45) Date of Patent: Sep. 12, 2017

(54) COLLOIDAL STABILIZATION OF BEER

(75) Inventors: Mustafa Rehmanji, Bloomingdale, NJ (US); Chandra Gopal, Middlesex (GB); Andrew Mola, Wayne, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 1303 days.

(21) Appl. No.: 10/920,535

(22) Filed: Aug. 18, 2004

(65) Prior Publication Data

US 2005/0019447 A1    Jan. 27, 2005

Related U.S. Application Data

(63) Continuation of application No. 09/881,173, filed on Jun. 14, 2001, now abandoned.

(51) Int. Cl.
*C12H 1/00* (2006.01)
*C12H 1/056* (2006.01)

(52) U.S. Cl.
CPC .................................. *C12H 1/0424* (2013.01)

(58) Field of Classification Search
CPC ............ C12H 1/00; C12H 1/02; C12H 1/0424
USPC ....................................... 426/422, 11, 12, 592
See application file for complete search history.

(56) References Cited

U.S. PATENT DOCUMENTS 2,939,791 A * 6/1960 McFarlane .................... 426/442
3,117,004 A * 1/1964 McFarlane et al. ............ 426/12
4,073,954 A * 2/1978 Mobius ....................... 426/330.3

FOREIGN PATENT DOCUMENTS

GB         2280908      *  2/1995  ............... C12C 7/00

* cited by examiner

*Primary Examiner* — Vera Stulii
(74) *Attorney, Agent, or Firm* — Thompson Hine LLP; William J. Davis

(57) ABSTRACT

In the beer-making process, the wort is treated with a processing aid which is a composite of Carrageenan and polyvinyl polypyrrolidone (PVPP).

4 Claims, No Drawings

COLLOIDAL STABILIZATION OF BEER

RELATED APPLICATIONS

This application is a Continuation Application of U.S. patent application Ser. No. 09/881,173, filed on Jun. 14, 2001, now abandoned.

BACKGROUND OF THE INVENTION

1. Field of the Invention

This invention relates to clarification/colloidal stabilization of beer, and, more particularly, to upstream removal of haze-forming precursors from beer, or prevention of haze by complexation of haze-producing proteins, polyphenol and other materials which are naturally present in beer.

2. Description of the Prior Art

Traditionally, beer has been stabilized against development of beer haze simply by physical storage, sometimes up to 3 months, at near freezing temperatures, known as "cold maturation". During standing, much of the least soluble materials, including the protein-polyphenol complexes, aggregate as particles that could be readily removed by precipitation or filtration. However, stabilization with process aids which can remove the haze-forming precursors in the wort (beer before fermentation), or beer is advantageous because it provides a beer with predictable stability over a long period of time and simplifies subsequent beer processing.

Accordingly, it is an object of this invention to provide a new and improved processing aid for colloidal stabilization of beer which can remove haze efficaciously from the wort.

A particular object herein is to provide as composite of Carrageenan and PVPP which can remove haze advantageously by upstream stabilization of wort in the brew house.

SUMMARY OF THE INVENTION

A Carrageenan-micronized PVPP composite is described herein which provides a novel and advantageous process aid for clarifying/stabilizing beer in the brew house, which is an upstream clarification/stabilization of beer. Suitably the materials are present in a weight ratio of 1:10 to 5:10, respectively, preferably about 3.5:10, and is added to the wort as a dose rate of about 5-60 g/hl, preferably about 10-15 g/hl.

DETAILED DESCRIPTION OF THE INVENTION

Carrageenan is a refined extract of red sea weed derived from species of *Chondrus* or *Euchema* sea weeds; it is a polysaccharide of repeating, non-homogeneous units of galactose and galactose sulfate monomers (sulfated D-galactans).

PVPP is crosslinked polyvinyl polypyrrolidone. PVPP is insoluble in beer, yet it will adsorb polyphenols from beer or wort.

The beer-making process generally includes the steps of (1) activating enzymes so that starch can be converted into sugar, which is extracted with water, (2) filtering to remove husks, and (3) boiling to coagulate proteins and polyphenols.

In the present process, the Carrageenan-PVPP composite is added in a single addition, together or as separate materials, about 10 minutes before the end of the boil, in the kettle. The boiling action in the kettle helps to mix the Carrageenan-PVPP composite in the boiling wort. Carrageenan is negatively charged so that there is a direct electrostatic interaction with positively charged non-microbial particles in the wort, for example, proteins, carbohydrates and metal ions.

The invention will now be described in more detail with reference to the following examples.

EXAMPLE 1

Lab Treatment of Wort Showing Effect of PVPP, Carrageenan, PVPP/Carrageenan Composite, Towards Tannoid Content, SASPL, Total Polyphenols and Nepholometric Titration of Haze Producing Polyphenols.

A 1-liter sample of wort (all-malt) was brought to a boil and a quantity of stabilizer was added. The mixture was allowed to boil for 15 minutes after addition. The volume was kept constant by addition of distilled water. The treated-wort was then placed in a refrigerator at 0° C. and cooled for 24 hours. Visual clarity of the sample was observed and noted. An aliquot of wort was drawn from the bulk liquid and filtered through a 1.6 μm syringe filter.

The filtered wort was analyzed for Tannoid content, SASPL (Saturated Ammonium Sulfate Precipitation Limit), Total Polyphenols and Haze Sensitive Polyphenols via the PT-Standard instrument (the above list of procedures are described under "Methods of Analysis"). The results are summarized in Table 1.

TABLE 1

Effect of Process Aid

| Ex. No. | Process Aid (by wt) | Dose Rate (g/hl) | Visual Clarity* | Tannoids (mg/l PVP K-90) | T-125 (ml/100 ml beer) | SASPL (ml/100 ml beer) | Total Polyphenols (mg/l) |
|---|---|---|---|---|---|---|---|
| 1 | Untreated | 0 | 1 | 84.6 | 10.72 | 5.5 | 244.4 |
| 2 | PVPP | 10 | 1 | 57.5 | 11.80 | 4.8 | 215.7 |
| 3 | Carrageenan | 3.5 | 2 | 88.8 | 11.18 | 5.6 | 246.0 |
| 4 | Carrageenan/PVPP (3.5:10) | 13.5 | 3 | 57.5 | 12.43 | 4.2 | 220.6 |
| 5 | Carrageenan/PVPP (3.5:10) | 10.0 | 2 | 60.3 | 12.45 | 4.1 | 231.2 |

*A higher value indicates better clarity

From the results it can be seen that the blending of Carrageenan with PVPP did not compromise efficacy of polyphenolic material removal (Tannins, Total Polyphenols). Visual clarity of Carrageenan/PVPP treated samples was equivalent or better than samples treated with Carrageenan alone.

EXAMPLE 2

Effect of Particle Size

A sample of wort was treated similarly as in Example 1 with Carrageenan/PVPP (3.5:10) blend at 15 g/hl and analyzed using the Elzone technique.

TABLE 2

Particle Size (μm)

Percentile of particles plotted against particle size in μm

|  | 0.1% | 1.0% | 6% | 22% | 50% | 78% | 94% | 99% | 99.9% |
|---|---|---|---|---|---|---|---|---|---|
| Treated | 0.206 | 0.207 | 0.219 | 0.258 | 0.361 | 0.571 | 0.862 | 1.187 | 3.333 |
| Untreated | 0.205 | 0.206 | 0.222 | 0.278 | 0.424 | 0.739 | 1.184 | 1.962 | 4.331 |

The results show that the treated sample had smaller particles at the indicated percentile values as compared to untreated sample. Clarity of the wort is related to the distinctly smaller particle size in the treated sample.

EXAMPLE 3

Effect of Process Aid on Wort Clarity

A sample of wort was treated as in Example 1 with a Carrageenan/PVPP (3.5:10) composite at 15 g/hl and was analyzed for haze. The total haze (0° C.) was read from cuvette using an Lg automatic haze meter.

TABLE 3

| Sample | Haze (EBC) |
|---|---|
| Treated | 7.1 |
| Untreated | 12.3 |

The results show that the treated sample was distinctly clearer in terms of haze.

EXAMPLE 4

Wort Yield-Plant Scale Trial

In a plant scale trial, wort was again treated with Carrageenan/PVPP (3.5:10) composite at 15 g/hl added about 10 minutes before end of kettle boil. The results were compared with a similarly prepared wort without composite added and with Carrageenan alone. The malt bill in both cases was 456 kg of malt plus 14.5 hl of water at mashing. In the test with Carrageenan alone, 3.9 g/hl of Carrageenan was added. The wort yield was determined by the volume of wort at kettle knock-out.

TABLE 4

| Sample Dose Rate | Wort Yield (hl) |
|---|---|
| Carrageenan/PVPP = 15 g/hl | 16.0 |
| Carrageenan, alone = 3.9 g/hl | 15.75 |
| Untreated, no treatment used | 15.5 |

The results show that the treated wort gave a 3.2% increase in wort yield as compared to untreated wort. When the results of Carrageenan alone at 3.9 g/hl were compared with untreated wort, the increase in wort yield was 1.6%.

EXAMPLE 5

Fermentation Time

The wort from Example 4 was monitored for fermentation time (drop in specific gravity against time). Samples were drawn at regular intervals to obtain data on fermentation vs. specific gravity in °Plato. The original gravity of the wort was 13.7°Plato (at the onset of fermentation) and the end gravity was 3.0°Plato (end of primary fermentation). The data below shows the number of hours to achieve this result.

TABLE 5

| Sample Dose Rate | Fermentation Time, hrs |
|---|---|
| Carrageenan/PVPP = 15 g/hl | 129 |
| Carrageenan, alone = 3.9 g/hl | 141 |
| Untreated, no treatment used | 144 |

The results show that the treated sample gave a reduction in fermentation time of 10.4% as compared to untreated fermenting wort. Carrageenan alone, when compared to the untreated sample gave a reduction in fermentation time of 2.1%. (3 hours less).

EXAMPLE 6

Analysis of Packaged Beer From Plant Trials

Treated and untreated wort from Example 4 was put through the beer making process and subsequently packaged. The packaged beer was analyzed for colloidal stability parameters.

TABLE 6

| Sample | T-125 Reagent PT-Standard (ml/100 ml of beer) | Tannoids Tannometer (mg PVP/l) | Total Polyphenols Spectrometer (mg/l) | P-40 Reagent PT-Standard (ml/100 ml of beer) | SASPL Tannometer (ml/100 ml beer) |
|---|---|---|---|---|---|
| Treated | 62.16 | Not Detected | 137.5 | 21.95 | 14.6 |
| Untreated | 11.68 | 39.0 | 168.1 | 27.89 | 14.1 |

The results show a marked reduction in the polyphenolic material content in the treated samples as compared to the untreated samples. This is given by the analysis of Tannoid content. Total Polyphenol and T-125 Nephlometric titration for haze-producing polyphenols.

EXAMPLE 7

Beer Haze/Accelerated Aging of Packaged Beer

Packaged beer from Example 6 was subjected to accelerated aging and the total haze was monitored.

TABLE 7

| | Permanent Haze | # of Cycles (1 cycle = 6 days at 37° C. + 1 day at 0° C.) Total Haze read at 0° C. | | | | | |
|---|---|---|---|---|---|---|---|
| Sample | Fresh beer at 22° C. (EBC) | 0 (EBC) | 1 (EBC) | 2 (EBC) | 3 (EBC) | 4 (EBC) | 5 (EBC) |
| Treated | 1.20 | 1.25 | 1.21 | 1.43 | 1.61 | 1.90 | 2.21 |
| Untreated | 1.51 | 1.50 | 1.72 | 1.95 | 2.32 | 2.68 | 3.11 |

The fresh-treated beer gave a lower total haze and permanent haze. Also, the results showed that the treated sample gave much lower development of haze with accelerated aging at 37° C.

Methods of Analysis

1. Tannoid Content (Tannometer)

Tannoids are defined as those fractions of the polyphenolic compounds that can be precipitated by the addition of PVP K90 to the beer sample. They include the low and medium molecular weight polyphenols. Haze in beer is a complex between condensed polyphenols, referred to as tannoids (T), and sensitive proteins (P) in an equilibrium governed by the law of mass action as shown in Equations (1) and (2):

$$P + T \leftrightarrow PT \quad (1)$$

so that $$[P] \times [T] = k[PT] \quad (2)$$

where [P] is the concentration of polypeptides and proteins (Sensitive Proteins defined as substances giving haze when tannin is added) and [T] is the concentration of tannoids that form precipitate with PVP K 90 (molecular weight 350,000).

For the analysis of Tannoids, a solution of PVP K-90 is injected into a beer sample. The Tannoids in the beer form a precipitate with PVP K-90 through hydrogen bonding. The addition of PVP K90 is plotted against the formation of haze and the maxima of the peak gives the Tannoid Content expressed as mg PVP/L beer.

2. Saturated Ammonium Sulfate Titration Limit (SASPL) (Tannometer)

This test gives information on the hydrophilic character of the colloidal constituents of beer. The addition of ammonium sulfate solution induces haze formation in beer. The greater the value of ammonium sulfate necessary to achieve a given haze value the higher the predicted stability of that beer.

The limit of precipitation is expressed as the volume of saturated ammonium sulfate solution that marks the beginning of the appearance of haze. However, there is no direct linear relationship between the precipitation limit and the colloidal stability of the beer; colloidal stability is also dependent on the tannin and oxygen content.

3. Total Polyphenols

Total polyphenols in beer is analyzed using Methods of Analysis of ASBC, method BEER-35. Both these methods read absorbance via spectrometer and give results in ppm.

4. Total Haze and Aging Test

The total haze is read directly from the bottle, using an Lg automatic haze meter. The haze meter is calibrated with certified haze standards obtained from Advanced Polymer Systems. All readings are taken with distilled water in the measuring chamber to prevent the formation of condensation on the outside surface of cold samples.

Haze readings are taken on fresh beer samples at 22° C. and at 0° C. Aging tests are performed by incubating samples in a dry oven at 37° C. for one 6-days and then transferring to storage at 0° C. for one day before taking total haze readings on the cold samples. Samples are put through this cycle for several weeks or until an excessive value for haze is obtained.

5. Elzone Particle Size/Particle Count Analysis

Elzone analyzers measure a low concentration of particles dispersed in an electrolyte solution in a sample vessel containing an electrode. An orifice tube (a tube that has a tiny, pinhole-shaped orifice through which particles can pass) is placed inside the sample vessel. Inside of the orifice tube is a second electrode. A steady electric current flows from the electrode in the sample vessel to the second electrode-inside the orifice tube. The sample solution is pulled through the orifice by a partial vacuum applied to the exit end of the tube. A particle blocks part of the orifice while passing through it, displacing the conductive electrolyte. This creates a change or pulse in the otherwise steady voltage. The number of pulses reflects the number of particles, and the size of the pulse determines the volume, and therefore the particle size. The Elzone analyzer counts and sizes the pulses and reports comprehensive data. Particles ranging from 1200 to 0.4 µm in diameter.

SUMMARY OF BENEFITS OF CARRAGEENAN-PVP TREATMENT (a) Improved compaction of whirlpool tub resulting in an increase in wort yield. The treated wort gives more wort gallonage (volume) as compared to untreated wort. The increase in volume of wort from the same weight of malt used is an economic advantage in the industry.
(b) Improved wort clarity.
(c) Carrageenan-PVPP treated wort ferments better in terms of the drop in gravity as a function of fermentation time. Shorter fermentation times are achieved resulting in an increase in beer production.
(d) Improved yeast vitality and crop.
(e) Improved filter run lengths.
(f) Improved beer haze, particularly reduction in total polyphenol and tannoid content, and an increase in predicted stability of packaged beer.

While a Carrageenan-PVPP composite is preferred for convenience in the process described, it will be understood that the individual materials may be added separately, if desired.

While the invention has been described with particular reference to certain embodiments thereof, it will be understood that changes and modifications may be made which are within the skill of the art. Accordingly, it is intended to be bound only by the following claims, in which:

What is claimed is:

1. A process of clarifying haze in beer which comprises treating the wort of beer with a composite of (a) Carrageenan and (b) polyvinyl polypyrrolidone (PVPP), wherein said composite is present in a weight ratio of (a):(b) of about 3.5:10, and said composite is added at a dose rate of about 15 g/hl, thus providing an increased wort yield, a decreased fermentation time, and increased beer stability.

2. A process according to claim 1 wherein said PVPP comprises micronized PVPP.

3. A process of clarifying haze in beer comprising: treating the wort of beer with (a) Carrageenan and (b) polyvinyl polypyrrolidone (PVPP), wherein (a) and (b) are present at a weight ratio of (a):(b) of about 3.5:10 and (a) and (b) are added at a dose rate of about 15 g/hl based on the total weight of (a) and (b) to produce a treated wort wherein said treated wort exhibits improved clarity compared to a wort treated with either Carrageenan or PVPP alone.

4. A process according to claim 3 wherein said PVPP comprises micronized PVPP.

* * * * *